United States Patent
Rector, Jr. et al.

[11] Patent Number: 5,288,820
[45] Date of Patent: Feb. 22, 1994

[54] THERMOSETTING COATING COMPOSITIONS

[75] Inventors: Franklin D. Rector, Jr., Osaka, Japan; J. Stewart Witzeman, Kingsport, Tenn.

[73] Assignee: Eastman Kodak Company, Rochester, N.Y.

[21] Appl. No.: 24,044

[22] Filed: Mar. 1, 1993

[51] Int. Cl.$^5$ ............................................ C08F 283/00
[52] U.S. Cl. ................................ 525/510; 525/523; 525/529; 525/533; 528/93
[58] Field of Search ............... 525/510, 523, 529, 533; 528/93

[56] References Cited

U.S. PATENT DOCUMENTS

| | | | |
|---|---|---|---|
| 3,892,903 | 7/1975 | Dowbenko | 525/514 |
| 4,031,290 | 6/1977 | Anderson et al. | 525/450 |
| 4,644,036 | 2/1987 | Walz et al. | 525/374 |
| 5,051,529 | 9/1991 | Witzeman et al. | 560/178 |
| 5,206,077 | 4/1993 | Cowley et al. | 428/224 |

FOREIGN PATENT DOCUMENTS 0227454 7/1987 European Pat. Off. .

OTHER PUBLICATIONS

J. S. Witzeman et al., "t-Butyl acetoacetate:A new reagent for the preparation of acetoacetylated materials", Chemspec USA 89 Symposium.

*Primary Examiner*—John C. Bleutge
*Assistant Examiner*—Randy Gulakowski
*Attorney, Agent, or Firm*—J. Frederick Thomsen; William P. Heath, Jr.

[57] ABSTRACT

Disclosed are thermosetting or curable coating compositions comprising (1) a film forming polymeric material bearing acetoacetate residues, (2) an amino resin cross-linking or curing material, (3) an organic sulfonic acid cross-linking or curing catalyst, and (4) an epoxide compound selected from limonene monoepoxide, limonene diepoxide and a mixture thereof. The presence of the limonene epoxide inhibit discoloration of the coating composition upon prolonged storage, especially at elevated temperatures.

5 Claims, No Drawings

THERMOSETTING COATING COMPOSITIONS

This invention pertains to certain novel thermo-setting or curable coating compositions comprising (1) a film forming polymeric material bearing acetoacetate residues, (2) an amino resin cross-linking or curing material, (3) an organic sulfonic acid cross-linking or curing catalyst, and (4) an epoxide compound selected from limonene monoepoxide, limonene diepoxide and a mixture thereof.

The present invention pertains to improvements in known coating compositions in which the polymeric, film-forming material contains acetoacetate residues which are reactive with known amino resins to effect curing or cross-linking of the polymeric, film-forming material. Acetoacetylated coatings resins are of interest to the coatings industry for a variety of reasons. For example, incorporation of the acetoacetate functionality provides several benefits including reduction of solution viscosity (which is valuable for the production of higher-solids coatings) and introduction of a functional group (the acetoacetate group) for polymer cross-linking. The acetoacetate-containing polymeric materials typically are prepared either by employing an acetoacetate-containing monomer or by reacting a polymer bearing hydroxyl groups with an acetoacetlyating compound such as diketene or an alkyl acetate ester such as methyl, ethyl, and tertiary butyl acetoacetate. The film-forming polymer may be a vinyl polymer such as acrylate and methacrylate polymers or a condensation polymer such as a polyester.

It has been discovered that the curable coating compositions described hereinabove become discolored over time. This color formation can be accelerated by storage at elevated temperature. Formation of color in a coating composition is undesirable, especially in an unpigmented (clear) coating. Neither the mechanism of the discoloration nor the identity of the color bodies is known.

We have discovered that the above-mentioned discoloration problem can be minimized or eliminated by incorporating into the curable coating compositions an effective amount of an epoxide compound selected from limonene monoepoxide, limonene diepoxide and a mixture thereof. The mechanism by which the limonene epoxide inhibits the formation of color bodies is not known. However, as is demonstrated in certain of the examples set forth herein, the limonene epoxides are significantly superior to other epoxides in their color inhibition effect.

The present invention therefore provides novel thermosetting or curable coating compositions comprising an inert solvent having dissolved therein (1) a film forming polymeric material bearing acetoacetate residues, (2) an amino resin cross-linking or curing material, (3) an organic sulfonic acid cross-linking or curing catalyst, and (4) an epoxide compound selected from limonene monoepoxide, limonene diepoxide and a mixture thereof. The coating compositions typically will contain additional materials such as one or more inert solvents, pigments, stabilizers and other additives.

Polyesters constitute one class of the film forming polymeric material bearing acetoacetate residues present in the coating compositions of the present invention. Such polyesters are prepared by the reaction and/or polymerization of one or more diols with one or more dicarboxylic acids in a manner that provides a polyester having free hydroxyl groups. The hydroxyl polyester then is reacted with diketene or an alkyl acetoacetate ester to provide the polyester bearing acetoacetate residues. Examples of the diols which may be used in the preparation of the hydroxyl polyesters include ethylene glycol, propylene glycol, 1,3-propanediol, 2,4-dimethyl 2-ethylhexane 1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,3-pentanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, p-xylylenediol, diethylene glycol, triethylene glycol, tetraethylene glycol, and pentaethylene, hexaethylene, heptaethylene, octaethylene, nonaethylene, and decaethylene glycols. Examples of the dicarboxylic acids which may be employed include oxalic, malonic, dimethylmalonic, succinic, glutaric, adipic, trimethyladipic, pimelic, 2,2-dimethylglutaric, azelaic, sebacic, fumaric, maleic, itaconic, 1,3-cyclopentanedicarboxylic, 1,2-cyclohexanedicarboxylic, 1,3-cyclohexanedicarboxylic, 1,4-cyclohexanedicarboxylic, phthalic, terephthalic, isophthalic, 2,5-norbornanedicarboxylic, 1,4-naphthalic; diphenic, 4,4'-oxydibenzoic, diglycolic thiodipropionic, 4,4'-sulfonyldibenzoic; and 2,6-naphthalenedicarboxylic acids.

Vinyl polymers such as acrylics and vinyl modified acrylics constitute a second class of the film-forming polymeric materials useful in the present invention. These polymers typically are prepared by the polymerization of a hydroxyl bearing monomer such as hydroxyethyl methacrylate, hydroxyethyl acrylate, hydroxyhexyl acrylate, hydroxyhexyl methacrylate, hydroxypropyl acrylate, hydroxypropyl methacrylate, hydroxybutyl acrylate, hydroxybutyl methacrylate and the like optionally polymerized with other monomers such as methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, styrene, vinyl acetate, and the like. The resulting hydroxyl-bearing polymer then is converted as described hereinabove to the corresponding acetoacetate-bearing polymer. The ratio of reagents and molecular weights of the resulting acrylic polymer are preferably chosen so as to give polymers with an average functionality (the number of acetoacetate groups per molecule) greater than or equal to 2, preferably greater than or equal to 4.

The preparation of typical acetoacetate-bearing polymers which may be used in the compositions provided by our invention is described in U.S. Pat. No. 5,051,529; European Patent Application Publication No. 227,454; Witzeman, Nottingham and Rector, J. Coatings Technol., 62, No. 789, pages 101–112; Witzeman and Clemens, "Diketene and Acetoacetates" in "Acetic Acid and Its Derivatives", Agreda and Zoeller, Editors, Marcel Dekker, Inc. (1993). The concentration of the film forming polymeric material in the inert solvent or vehicle may range from about 30 to 90 weight percent based on the combined weight of the polymeric material and the solvent. Suitable solvents for the curable coating compositions include xylenes, ketones such as methyl amyl ketone and cyclohexanone, 2-butoxyethanol, ethyl 3-ethoxypropionate, toluene, and other volatile inert solvents typically used in industrial, thermo-setting coating compositions. The amino resin, cross-linking agent present in our novel coating compositions comprises compounds having a plurality of —N(CH$_2$OR)$_2$ functional groups wherein R is C$_1$–C$_4$ alkyl, preferably methyl. Typical cross-linking agents have the following formulae, wherein R is independently C$_1$–C$_4$ alkyl:

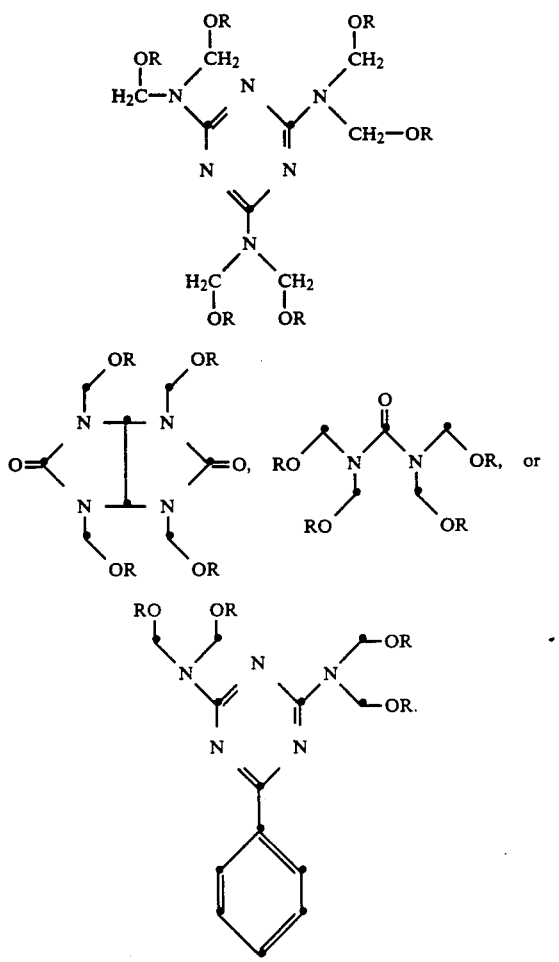

Hexamethoxymethylmelamine, tetramethoxymethylbenzoguanamine, tetramethoxymethylurea, and mixed butoxy/methoxy substituted melamines comprise the preferred cross-linking agents. The most preferred cross-linking agent is hexamethoxymethylamine. The amount of the amino resin cross-linking agent present in the coating compositions can vary considerably depending, for example, on the particular acetoacetate-substituted, film-forming, polymeric material and amino resin cross-linking agent employed. Typically, the amount of cross-linking agent is in the range of about 5 to 55 weight percent, based on the weight of the film-forming, polymeric material. However, the amount of cross-linking agent preferably is in the range of about 10 to 40 weight percent (same basis).

The organic sulfonic acid employed to catalyzed the reaction of the acetoacetate-substituted, film-forming, polymeric material and the amino resin cross-linking agent may be any alkyl, cycloalkyl or aryl, including substituted aryl, sulfonic acid containing up to about 40 carbon atoms. Alkyl-substituted aryl sulfonic acids such as toluenesulfonic acid, dodecylbenzenesulfonic acid and dinonylnaphthalenesulfonic acid represent the preferred cross-linking catalysts. The amount of the sulfonic acid cross-linking catalyst present in the coating compositions generally is about 0.1 to 2 weight percent, based on the weight of cross-linking agent and polymer present.

As specified hereinabove, an essential ingredient of our novel coating compositions is an epoxide selected from limonene monoepoxide, limonene diepoxide and mixtures thereof. Generally, the epoxide material is employed in an amount which gives a mole ratio of epoxide material to organic sulfonic acid catalyst of approximately 1.1. However, the mole ratio of epoxide to sulfonic acid may be varied from about 0.8:1 to 1.5:1.

The coating compositions of the present invention may contain one or more leveling and flow control agents, pigment wetting and dispersing agents, tinting pigments; defoaming and antifoaming agents, anti-settling, antisag, and bodying agents anti-skinning agents, antiflooding and anti floating agents, fungicides and mildewicides, thickening agents, and/or coalescing agents. Such additives as normally constitute a relatively minor proportion of the coating composition, e.g., about 0.05 to 5.00 weight percent.

The pigments which may be used in the coating compositions may be selected from various organic and inorganic pigments well known to those skilled in the art. Specific examples include the following: CI Pigment White 6 (titanium dioxide); CI Pigment Red 101 (red iron oxide); CI Pigment Yellow 42, CI Pigment Blue 5, 15:1, 15:2, 15:3, 15:4 (copper phthalocyanines); CI Pigment Red 49:1; and CI pigment Red 57:1.

The curable coating compositions may be applied to various substrates or articles such as steel, aluminum, or galvanized sheeting (either primed or unprimed), heated to a temperature of about 120° C. to 175° C. for a period of about 5 to 45 minutes to effect cross-linking and subsequently allowed to cool.

The novel thermosetting, coating compositions of the present invention preferably comprise an inert solvent having dissolved therein (1) about 50 to 80 weight percent of a film forming polymeric material selected from polyesters and acrylic polymers bearing acetoacetate residues, said percent being based on the weight of film-forming polymeric material and the solvent;

(2) about 49 to 5 weight percent, based on the weight of polymeric material (1), of an amino resin cross-linking agent;

(3) about 0.05 to 2 weight percent, based on the combined weight of polymeric material (1) and cross-linking agent (2), of an organic sulfonic acid cross-linking or curing catalyst; and (4) an epoxide compound selected from limonene mono-epoxide, limonene diepoxide and mixtures thereof.

The benefits and advantages provided by the present invention are further illustrated by the following examples. In the examples, APHA refers to a platinum-cobalt scale color as measured on am Orbeco-Hellige Aqua Tester using 611-T 200 mm tubes. The composition of the materials used in the examples is:

Cymel 303 resin is a fully methylated melamine-formaldehyde resin with a degree of polymerization (average number of triazine units per molecule) of approximately 1.75 and a maximum free formaldehyde level of 0.5 %. This material is supplied neat (minimum solids level 98%).

Cymel 373 resin is a partially methylated melamine-formaldehyde resin. This material reacts principally through the methoxymethylol functional group (HOCH$_2$N(CH$_2$OCH$_3$)). It has a degree of polymerization of approximately 2.0, a maximum free formaldehyde content of 3.0% and is supplied as 83–88% solids in water.

Cymel 1133 resin is a fully alkoxylated melamine-formaldehyde resin wherein the alkoxy groups are a mixture of methyl and butyl groups. This material has a degree of polymerization of 1.6, a maximum free formaldehyde level of 0.2% and is supplied neat (minimum solids 98 %).

Cymel 1156 is a fully butylated melamine formaldehyde resin with a degree of polymerization of about 2.9 and a maximum free formaldehyde level of 0.5%. This material is supplied neat (minimum solids level 96%).

Cymel 327 resin is a high imino, partially methylated melamine formaldehyde resin. This material reacts principally through the methoxymethyl-imino functional group (HN(CH$_2$OCH$_3$)). It has a degree of polymerization of ca. 1.75 and a maximum free formaldehyde content of 1.0% and is supplied as 88–92% solids in isobutanol.

Cymel 350 resin is a partially methylated version of Cymel 303 resin which contains some methoxy methylol groups. It has a degree of polymerization of 1.55 and a maximum free formaldehyde content of 2.5% and is supplied neat at a minimum solids level of 97%.

Cymel 1172 is a tetramethylol glycoluril resin and contains no alkylation. It is monomeric in nature, has a maximum formaldehyde level of 1.5% and is supplied as a 43–47% solids solution in water. All of the Cymel products are produced by American Cynamid Co., Wayne, N.J., USA.

Resimine 747 resin is a fully methylated melamine-formaldehyde resin similar in its composition to Cymel 303. This product is available from Monsanto Chemical Co, St. Louis, Mo., USA, which offers a variety of Resimine products which are similar to the Cyanamid products. Examples are Resimine 755 which is a butylated/methylated melamine-formaldehyde resin similar to Cymel 1133; Resimine 872 and 881 which are fully butylated melamine-formaldehyde resins similar to Cymel 1156; and Resimine 714 which is similar to Cymel 373. Similar results are obtained when the cross-linking agent is a methylated urea-formaldehyde adduct such as Monsanto's Resimine U-975 and U-980 and American Cynamid's Beetle 60, 65 and 80 resins.

The Cymel and Resimene resins are commercial embodiments of the amino resin cross-linking agents described hereinabove.

Vikoflex 7010 is a methyl epoxy sorbate available from Elf-Atochem.

Vikoflex 12 is a 1,2-dodecane oxide available from Elf-Atochem.

Vikoflex 7170 is an epoxidized soybean oil available from Elf-Atochem.

Poly Bd 605 is an internally epoxidized polybutadiene polymer available from Elf-Atochem. It contains 6.5 weight percent epoxy and has an average number molecular weight of 1300 and an epoxy equivalent weight of 260.

Poly Bd 130 is a lower viscosity analog of Poly BD 605, also available from Elf-Atochem.

Epoxy Polybutene is an epoxidized polybutadiene polymer having an I.V. of 3.18.

Nacure XP-379 is an experimental, amine-blocked dodecylbenzenesulfonic acid catalyst supplied by King Industries as a 25% active solution in isopropanol.

Nacure 5076 is dodecylbenzenesulfonic acid catalyst supplied by King Industries as an approximately 70% solution in isopropanol.

COMPARATIVE EXAMPLES C1–C8

To simulate the discoloration problem encountered in the formulation of coating compositions, solutions of ethyl acetoacetate (21.6 g), p toluenesulfonic acid (2.2 g of a 20% solution in n-butanol) and various amino resin cross-linking agents were prepared. All of the solutions had initial APHA colors of less than 10. Each of the solutions was heated at 140° F. for eight hours and the APHA of each was measured. The particular amino resin and the amount thereof (g) and the APHA color of each sample solution after eight hours at 140° C. is shown in Table I.

TABLE I

| Example | Amino Resin Type | Amount | APHA Color |
|---|---|---|---|
| C-1 | Cymel 303 | 65.0 | 150 |
| C-2 | Cymel 373 | 76.5 | 300 |
| C-3 | Cymel 1133 | 65.0 | 70 |
| C-4 | Cymel 1156 | 75.2 | 40 |
| C-5 | Cymel 327 | 72.2 | 50 |
| C-6 | Cymel 350 | 92.4 | 50 |
| C-7 | Cymel 1172 | 31.8 | >500 |
| C-8 | Resimene 747 | 65.0 | 200 |

The examples of Table I show that solutions of an alkyl acetoacetate, an organic sulfonic acid and an amino resin increase significantly in color after accelerated aging by heating at pb 140° F. for eight hours. The Example C-2 sample exhibited haze and white streaks after heating and, over time, it increased in viscosity and eventually gelled. The Example C-5 sample exhibited a noticeable viscosity increase after heating.

EXAMPLES 1–3 AND COMPARATIVE EXAMPLES C9–C15

Comparative Example C-1 was repeated a number of times except that an epoxide compound was included in the solution of each example (except Example C-1 which is shown for purposes of comparison). The amount of each epoxide compound used was 1.7 g except for Example 3 in which 3.4 g of limonene monoepoxide was used. All of the solutions has initial EPHA colors of less than 10. The particular epoxide compound and the APHA color of each sample solution after eight hours at 140° C. is shown in Table II.

TABLE II

| Example | Epoxide Compound | APHA Color |
|---|---|---|
| C-1 | Control | 150 |
| 1 | Limonene Diepoxide | 10 |
| 2 | Limonene Monoepoxide | 20 |
| 3 | Limonene Monoepoxide | 5 |
| C-9 | Vikoflex 7010 | 80 |
| C-10 | Alpha Pinene Epoxide | 100 |
| C-11 | Vikoflex 12 | 100 |
| C-12 | Poly Bd 605 | 100 |
| C-13 | Poly Bd 130 | 100 |
| C-14 | Vikoflex 7170 | 150 |
| C-15 | Epoxy Polybutene | 150 |

The results reported in Table II clearly show the superiority of the limonene epoxides in inhibiting color formation in the solution samples of Examples 1–3 as compared to Comparative Examples C9–C15.

EXAMPLE 4 AND COMPARATIVE EXAMPLE C16

To simulate the discoloration problem encountered in the formulation of coating compositions, two solutions of Resimene 747 amino resin cross-linking agent (75.0 g), ethyl acetoacetate (25.0 g) and Nacure 5076 dodecylbenzenesulfonic acid (0.5 g) solution were prepared. Limonene diepoxide (2.0 g) was included in the Example 4 solution but was not in the Comparative Example C16 solution. All of the solutions had initial APHA colors of less than 10. Each of the solutions was heated at 140° F. for eight hours and the APHA of each was measured: The final APHA color of the Example 4 solution was 40 whereas the APHA color of the Comparative Example C16 solution was 100.

EXAMPLE 5 AND COMPARATIVE EXAMPLE 17

The procedure of Example 4 and Comparative Example 16 was repeated except that the Resimene 747 was replaced with 75.0 g of Cymel 303 amino resin. The initial APHA color of the solutions was less than 10. After heating at 140° F. for eight hours, the APHA color of the Example 5 solution (to which 2.0 g limonene di-epoxide had been added) was 10 whereas the final APHA color of the Comparative Example 17 solution (to which no epoxide was added) was 100.

The invention has been described in detail with particular reference to preferred embodiments thereof, but it will be understood that variations and modifications can be effected within the spirit and scope of the invention.

We claim:

1. A thermosetting coating composition comprising an inert solvent having dissolved therein:
   (1) about 50 to 80 weight percent of a film forming polymeric material selected from polyesters and acrylic polymers bearing acetoacetate residues, said percent being based on the weight of film-forming polymeric material and the solvent;
   (2) about 49 to 5 weight percent, based on the weight of polymeric material (1), of an amino resin cross-linking agent;
   (3) about 0.05 to 2 weight percent, based on the combined weight of polymeric material (1) and cross-linking agent (2), of an organic sulfonic acid cross-linking or curing catalyst; and
   (4) an epoxide compound selected from limonene monoepoxide, limonene diepoxide and mixtures thereof wherein the mole ratio of epoxide compound (4) to organic sulfonic acid (3) is about 0.8:1 to 1.5:1.

2. The composition of claim 1 wherein cross-linking agent (2) is an amino resin selected from the group consisting of fully or partially alkoxylated methoxymelamines, a fully or partially alkoxylated benzoguanamine, or a fully or partially alkoxylated methoxyurea, wherein each alkoxyl group contains up to 4 carbon atoms.

3. The composition of claim 1 wherein cross-linking agent (2) is a hexamethoxymethylmelamine derivative.

4. The composition of claim 1 wherein cross-linking agent (2) is a fully alkoxylated methxylated methylmelamine wherein the alkoxy groups are a mixture of methoxy and butoxy groups.

5. The composition of claim 1 wherein cross-linking agent (2) is a partially methoxylated methoxymelamine.

* * * * *